United States Patent [19]
Wardlaw

[11] 3,899,089
[45] Aug. 12, 1975

[54] REMOVABLE MOUNTED HOIST FOR PICK-UP TRUCK

[76] Inventor: N. J. Wardlaw, 3100 Pine Ave., Waco, Tex. 76708

[22] Filed: June 28, 1974

[21] Appl. No.: 484,258

Related U.S. Application Data

[63] Continuation-in-part of Ser. No. 439,953, Feb. 5, 1974, abandoned.

[52] U.S. Cl. ............... 214/75 H; 212/46 R; 212/64
[51] Int. Cl. .............................................. B60p 1/46
[58] Field of Search ........ 214/75 R, 75 H, 75 T, 85, 214/95 R; 187/9 R; 212/10–15, 28, 46 R, 64, 61

[56] References Cited
UNITED STATES PATENTS

| | | | |
|---|---|---|---|
| 1,464,131 | 8/1923 | Goodger | 214/75 H |
| 2,862,628 | 12/1958 | Coates et al. | 214/75 H |
| 3,578,179 | 5/1971 | Fujioka | 212/61 |
| 3,774,788 | 11/1973 | Sower et al. | 214/75 H |

FOREIGN PATENTS OR APPLICATIONS

| | | | |
|---|---|---|---|
| 248,388 | 1/1961 | Australia | 214/75 H |
| 1,025,204 | 1/1953 | France | 214/75 H |

*Primary Examiner*—Robert J. Spar
*Assistant Examiner*—R. B. Johnson
*Attorney, Agent, or Firm*—Francis B. Francois

[57] ABSTRACT

The lower ends of two vertical standards are received in sockets provided on the sideboards of a pick-up truck box, the upper ends of the standards being connected by a detachable bridging member. A boom assembly is pivotally mounted on one of the vertical standards, and is swingable from a position outside the truck box to a position disposed over the box, the boom assembly carrying a winch and cable assembly for lifting heavy objects. When not in use the boom assembly is movable into alignment with the bridging member for storage, where it is secured. In one embodiment the boom assembly is extendable, to enable handling elongated objects. The hoist is designed for easy mounting on and removal from the truck box.

12 Claims, 11 Drawing Figures

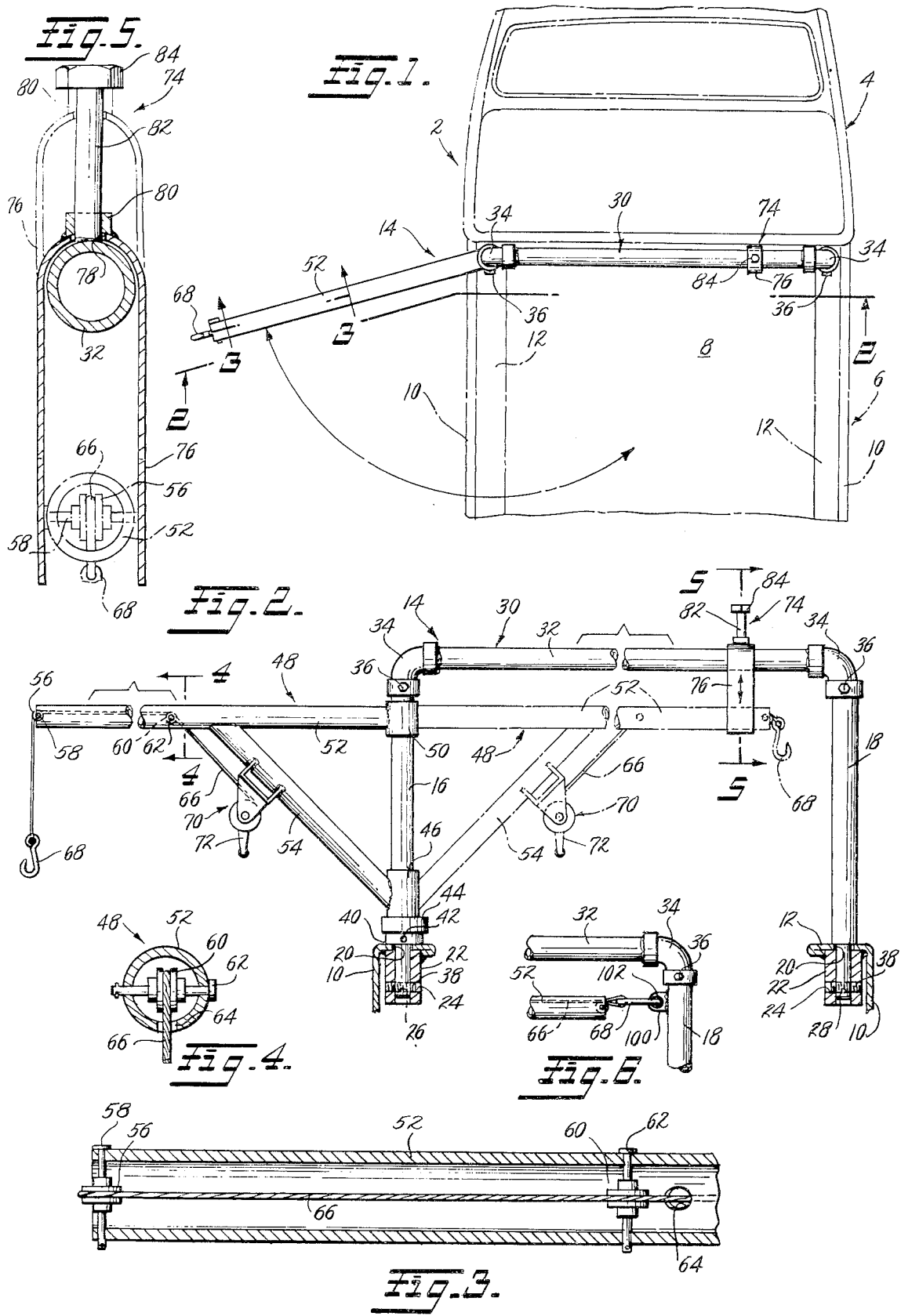

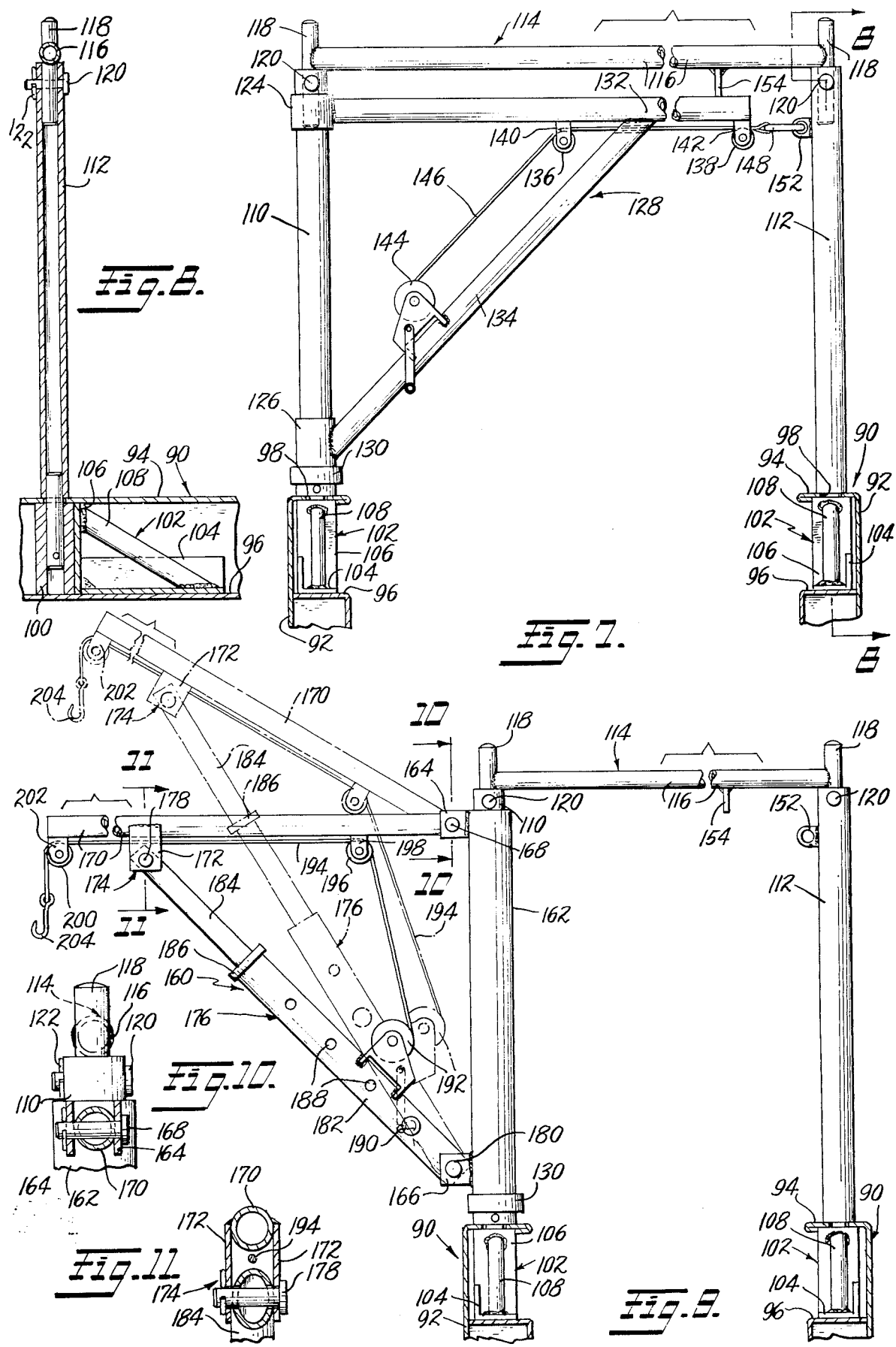

REMOVABLE MOUNTED HOIST FOR PICK-UP TRUCK

This application is a continuation-in-part of my co-pending application Ser. No. 439,953, filed Feb. 5, 1974, now abandoned.

BACKGROUND OF THE INVENTION

1. Field of the Invention

The present invention relates generally to hoists for use in helping to place objects on and to remove them from the bed or box of a truck. More particularly, it relates to a hoist for a pick-up truck, designed to be easily mounted on and removed from the box of the pick-up truck, and which is especially designed to aid in the loading of heavy game and other like objects.

2. Description of the Prior Art

The bed or box of a truck is located some distance above the ground, and thus it is often necessary to lift heavy objects some distance before they can be placed thereon. In order to assist in such lifting, different types of hoisting equipment have been devised. Frequently a hoist apparatus will be permanently installed at a truck loading area, such as the conventional boom or traveling crane type of hoist. In addition, trucks are sometimes fitted with heavy, permanently mounted hydraulic hoist equipment such as that which is the subject of U.S. Pat. No. 2,755,943. Permanently mounted on-the-truck hoists of the general type shown in said patent are frequently used in moving masonry materials, caskets, burial vaults, and the like.

While such conventional hoist equipment is generally satisfactory for commercial trucking operations, it fails to meet the needs of the operator of a light duty truck of the pick-up type. The operator of a pick-up truck uses it to pick up and discharge loads at various, and often remote, locations. For example, hunters seeking deer and other heavy game will often travel to a hunting area by pick-up truck, with the intention of loading any killed game into the truck box for transportation home. Farmers will frequently use a pick-up truck to move heavy objects about the farm or to a repair shop, and contractors will often use such a truck to move materials to and from a work site.

There often is no available on-site hoisting equipment for a pickup truck operator, because of the scattered locations at which the truck is used. Further, truck mounted hoist devices such as that which is the subject of said U.S. Pat. No. 2,755,943 are unsuited to installation on a pick-up truck, because of their heavy weight, bulkiness and structural demands, and cost. There is thus a need for an economical, compact and easily installed and removed hoist for use on pick-up trucks. The present invention is intended to satisfy that need.

SUMMARY OF THE INVENTION

A pick-up truck is a relatively light duty vehicle, comprising a cab mounted on the forward end of a chassis, and a truck box mounted behind the cab. The truck box will normally include spaced sideboards that are a structural part of the truck body and which are permanently fixed in place, and a tailgate that is hinged to the truck bed. The hoist of the present invention is designed to be mounted on the sideboards of a pick-up truck box, an arrangement which involves a minimum of interference with the holding capacity of the box, and which takes advantage of the structural stability of said sideboards.

The preferred location for mounting the present hoist is at the forward end of the sideboards, although a location at some other position along the length of the sideboards is possible if so desired. To provide for the mounting of the present hoist equipment, oppositely disposed, upwardly facing sockets are formed in the sideboards where the hoist is to be positioned, the sockets being suitably braced if necessary.

The hoist of the invention includes a pair of vertical standards, the lower ends of which are received in the sideboard sockets and secured by removable pin means. The upper ends of the vertical standards are connected by a bridging member that preferably is removable, the bridging member and the vertical standards providing a rigid structural hoist frame. A braced, horizontally extending boom assembly is pivotally mounted on one of the vertical standards, and is swingable from a position outside of the truck box to a position disposed over the bed of the box.

The outer end of the boom assembly has pulley means thereon, over which one end portion of a cable is run. The other end of the cable is secured to a winch mounted on the boom assembly. The free, outer end of the cable is fitted with a hook or other suitable load-engaging means. When the hoist of the invention is used to load an object, say a dead deer or other animal, the boom assembly is swung outwardly to extend over the object to be loaded. The free end of the cable is then engaged with the load, and the winch is operated to lift the object to a height such that it will clear the truck box sideboard when the boom assembly is swung inwardly. With the load thus elevated, the boom assembly is then swung inwardly about the vertical standard upon which it is mounted, until the load is disposed over the truck bed. The winch is then loosened, to lower the object onto the bed. When it is desired to unload an object from the truck bed, this procedure is simply reversed.

When the boom assembly is not in use, it is swung into a position underlying the bridging member. A latch bracket carried by the bridging member is then engaged with the boom assembly, whereby it is secured in a storage position, or alternatively the cable hook is engaged with a latch welded on the other vertical standard, after which the winch is used to tighten the cable.

In some instances the object to be moved will be longer vertically than the distance between the horizontal boom and the top surface of the truck box sideboard, making loading and unloading difficult. To solve this problem one embodiment of the invention utilizes an extendable or adjustable boom assembly, which can be elevated to handle lengthy objects.

The hoist of the invention is relatively light in weight and economical to construct from commonly available materials, and can be easily installed and removed on a pick-up truck box by one man. At the same time, it is effective to help load and unload objects that are heavy and bulky, and is designed to offer a minimum of structural interference with the normal use of the pick-up truck.

It is the principal object of the present invention to provide a removable hoist assembly for a pick-up truck, effective to help load and unload heavy objects.

Another object is to provide a hoist assembly that can be easily installed and removed from the truck box, and which offers a minimum of interference with the use of the truck box when installed thereon.

A further object is to provide a pick-up truck hoist assembly with a horizontally extending boom assembly, designed to store the boom assembly in a retracted position when not in use.

Another object is to provide a hoist boom assembly that can be extended or adjusted in length so as to elevate the outer end thereof, for use in handling overly long objects.

A still further object is to provide a pick-up truck hoist assembly that is economical to construct, and relatively light in weight.

Yet another object is to provide a hoist assembly fitted with a winch and cable assembly, for use in lifting heavy objects into and out of a pick-up truck box.

Other objects and many of the attendant advantages of the invention will become readily apparent from the following Description of The Preferred Embodiments, when taken in conjunction with the attached drawings.

BRIEF DESCRIPTION OF THE DRAWINGS

FIG. 1 is a plan view of a first embodiment of the removable hoist of the invention, shown mounted on a pick-up truck box at the forward end thereof, just behind the truck cab;

FIG. 2 is a fragmentary elevational view on a larger scale of the hoist of FIG. 1, taken substantially on the line 2—2 of FIG. 1, with the boom assembly of the invention shown extending outwardly from the truck box, and with the storage position of the boom being indicated by phantom lines;

FIG. 3 is an enlarged fragmentary vertical sectional view of a portion of the outer end of the horizontal boom assembly of FIG. 1, taken on the line 3—3 in FIG. 1;

FIG. 4 is an enlarged vertical sectional view, taken on the line 4—4 in FIG. 2;

FIG. 5 is a vertical sectional view, taken on the line 5—5 of FIG. 2, showing the latch bracket for holding the boom assembly in its stored, inoperative position;

FIG. 6 is a fragmentary view of another latch arrangement for securing the boom assembly;

FIG. 7 is a view similar to FIG. 2 of a second embodiment of the present hoist, utilizing a different form of bridging member, and wherein the cable and hoist are mounted in a different manner;

FIG. 8 is a vertical sectional view taken on the line 8—8 in FIG. 7;

FIG. 9 is a view similar to FIG. 2, but showing a third embodiment of the invention wherein the boom assembly is extendable;

FIG. 10 is an enlarged fragmentary sectional view taken on the line 10—10 in FIG. 9; and FIG. 11 is an enlarged fragmentary sectional view taken on the line 11—11 in FIG. 9.

DESCRIPTION OF THE PREFERRED EMBODIMENTS

Referring now to the drawings, a pick-up truck is indicated generally at 2, and includes a cab 4 behind which a truck box 6 is located. The truck box 6 includes a bed 8, and a pair of sideboards 10 made of sheet metal and formed as a permanent element of the pick-up truck 2. Normally, the sideboards 10 will include a relatively flat upper surface 12.

The removable, mounted hoist of the first embodiment of the invention is indicated generally at 14, and includes vertical standards 16 and 18. The hoist 14 is preferably mounted immediately behind the cab 4, and for this purpose the top surfaces 12 of the sideboards 10 have oppositely disposed openings 20 cut therein, beneath which are mounted socket-forming members 22. The socket-forming members 22 of the preferred embodiment comprise sections of pipe welded to the sideboards 10 and each having a transverse bore 24 therethrough, but it is to be understood that they can be otherwise formed if desired. Further, it is to be understood that to the extent found necessary or desirable, the socket-forming member 22 can be braced to the sideboards 10 or other portions of the truck box 6, with gusset plates or the like, welded or otherwise secured in position. The socket-forming members 22 are designed to receive the lower ends of the standards 16 and 18, and thus function to support the hoist apparatus; for this reason, it is necessary that they be mounted in a suitable structurally sound manner.

The lower ends of the standards 16 and 18 have transverse bores 26 and 28 extending therethrough, and the upper ends thereof are connected by a bridging member 30. The bridging member 30 comprises a length of pipe 32 having elbows 34 mounted on its opposite ends, the lower, downwardly facing ends of the elbows 34 being receivable on the upper ends of the standards 16 and 18 and being secured thereto by bolts 36. This arrangement enables the bridging member 30 to be disassembled from the vertical standards 16 and 18 for easy storage, while providing a rigidly braced structure when assembled. If desired, of course, the bridging member can be welded or otherwise permanently secured in place; however, this will make the hoist more difficult to remove and store. The lower ends of the standards 16 and 18 are receivable in the socket-forming members 22, and are secured in place by bolts 38 threaded into the bores 24 and passing through the transverse bores 26 and 28, whereby the hoist assembly 14 is mounted on the pick-up truck 2. Pins could of course be used in place of the bolts 38.

The vertical standard 16 has a stop collar 40 fixed thereto by a set of screws 42, or by other suitable means, and which is positioned at the level of the sideboard top surface 12. A bearing 44 rests on the stop collar 40, and resting thereon is the lower mounting collar 46 of a swingable boom assembly 48. The boom assembly 48 further includes an upper mounting collar 50 also received on the vertical standard 16, and to which the inner end of a horizontally extending tubular boom 52 is welded. A tubular, angled brace 54 is welded between the middle of the boom 52 and the lower mounting collar 46, thereby completing the cantilever mounting of the horizontal boom 52. The boom assembly 48, with the assistance of the bearing 44 and the two aligned mounting collars 46 and 50, is freely swingable about the vertical axis of the standard 16 between a position extending outwardly from the truck body 6, as shown in full lines in FIGS. 1 and 2, and a position disposed over the truck bed 8.

The boom 52 has a pulley 56 mounted at its outer end by a shaft 58, and spaced inwardly therefrom forwardly of the angled brace 54 is a second pulley 60 mounted on a shaft 62. The boom 52 has an opening 64 therein beneath the pulley 60, and a cable 66 passes over the two pulleys 56 and 60, and downwardly through the opening 64, the outer, free end of the cable 66 being secured to a hook 68, or the like.

The other end of the cable 66 is engaged with a winch mechanism 70, mounted on the angled brace member 54. The winch mechanism 70 can be of any suitable commercially available type, and includes a handle 72 for operating the same. In use, the hook 68 is engaged with the object to be loaded, and the winch mechanism 70 is then operated to elevate the load to a level above that of the sideboards 10. Thereafter, the load is moved into or out of the truck box 6 merely by swinging the boom assembly 48 on the bearing 44. When the object is positioned where desired, the winch mechanism is operated in a reverse direction to lower the load into a resting position, the hook 68 then being disengaged therefrom.

When the boom assembly 48 is not in use, such is swung into a storage position disposed beneath the bridging member 30, where it is retained by a suitable latch mechanism. In the first embodiment of the invention the latch mechanism utilized to secure the boom assembly 48 is indicated generally at 74, and comprises an inverted U-shaped latch bracket 76 having an opening 78 through the center of the bend therein, and about which a short bushing 80 is welded. A pin 82 having a head 84 thereon is secured to extend upwardly from the tubular member 30, and the U-shaped bracket 76 is mounted thereon. The length of the pin 82 is sufficient to allow the bracket 76 to be raised so that the outer end of the boom assembly 48 can be passed thereunder, whereupon the bracket 76 is released and allowed to fall by gravity into engagement with the tube 30. The boom assembly 48 is then latched in its storage position, from which it can be released merely by lifting the bracket 76 clear thereof. The bushing 80 prevents twisting of the U-shaped member 76 about the axis of the tubular member 30. It is to be understood that another latching mechanism can be substituted for that shown, if desired.

The hoist 14, as can be readily seen, is easily installed on and removed from the pick-up truck 2, and can be handled by one man. Further, it is made of commonly available materials, and can be economically constructed. When in place it interferes minimally with the normal use of the truck box 6, and yet is always readily available for assistance in loading or unloading heavy objects.

A modified latch arrangement is shown in FIG. 6, wherein the member 76 is eliminated. Instead, a latch 100 with a bore 102 therein is welded to the other vertical standard 18. The hook 68 is engageable therewith, and the winch 70 is tightened to secure the boom assembly in a storage position.

Referring now to FIGS. 7 and 8, a second embodiment of the invention is shown. In these figures a truck box 90 is shown having sideboards 92 thereon, the sideboards 92 including a flat top surface 94 and a horizontal ledge 96 directly under but spaced from the top surface 94. Openings 98 are provided in the sideboard top surfaces 94, and as in FIGS. 1 and 2 socket members 100 are welded or otherwise secured therebeneath. As has been mentioned, in some instances it may be necessary or desirable to brace the socket members 100, and such braces are indicated at 102 in FIGS. 7 and 8.

The braces 102 each comprise an angle iron 104 secured to the ledge 96, a plate 106 being welded to the forward end of the angle iron 104, and the associated socket member 100 being welded to the plate 106. An angled brace 108 is then welded to extend between the plate 106 and the opposite end of the angle iron 104. The brace 102 is merely illustrative of how such braces can be constructed and placed, and the type of brace actually employed in a given situation will depend to a great extent on the structural design of the truck box.

In FIGS. 8 and 9, tubular vertical standards 110 and 112 like the standards 16 and 18 are utilized, the lower ends thereof being mounted in the socket members 100. The upper ends of the standards 110 and 112 are connected by a removable bridging member 114, which comprises a tubular member 116 having vertical shafts 118 welded to its opposite ends. The shafts 118 are telescopically received in the upper ends of the standards 110 and 112, and are secured in place by pins 120 that in turn are held in place by keys 122. The bridging member 114 is more economical to construct and easier to install and remove than the member 30 in FIGS. 1 and 2, but serves the same function.

Mounted on the vertical standard 110 by upper and lower spaced collars 124 and 126 is a boom assembly 128, the lower collar 126 resting on a bearing 130. The boom assembly 128 includes a horizontal boom 132 welded at one end to the upper collar 124 and braced by a member 134 welded to the lower collar 126. In FIGS. 7 and 8 the pulley system is external rather than internal to save fabrication costs and to make repairs easier, and comprises inner and outer pulleys 136 and 138 carried by brackets 140 and 142, respectively, welded to the underside of the horizontal boom 132. A winch assembly 144 is mounted on top of the brace member 134, and the cable 146 therefrom runs first over the pulley 136, then through a bore provided in the upper end of the brace member 134, and thence over the outer pulley 138. A hook 148 is fastened to the outer end of the cable 146.

The boom assembly 128 functions like the boom assembly of FIGS. 1 and 2, and when such is not in use it is stored beneath the bridging member 114. A latch 152 is secured to the vertical standard 112 for engagement by the hook 148 to secure the stored boom in position, and a depending plate 154 on the bridging member 114 prevents vertical bouncing of the outer end of the boom assembly.

Turning now to FIGS. 9–11, a third embodiment of the invention is shown wherein the boom assembly 160 is extendable or adjustable, to provide for handling overly long loads. In said figures, a truck box 90 like that in FIGS. 7 and 8 is shown, carrying vertical standards 110 and 112 connected by a bridging member 114.

Rather than being mounted with spaced upper and lower collars on the vertical standard 118, the boom assembly 160 is carried on a single elongated cylindrical mounting collar 162 received on the vertical standard 118 and resting on a bearing 130. This one-piece mounting collar is necessary for structural reasons, and carries aligned pairs of upper and lower spaced swivel brackets 164 and 166 thereon. Received between the upper pivot brackets 164 and carried by a heavy duty swivel pin 168 is the inner end of a tubular boom 170, the boom 170 having downwardly directed, spaced plates 172 thereon near its outer end which form another swivel bracket 174. A telescopic brace member 176 has its upper end pivotally secured by a heavy duty swivel pin 178 to the boom swivel bracket 174, and its lower end connected by a heavy duty swivel pin 180 to the lower swivel bracket 166.

The brace member 176 comprises a lower tubular member 182 which receives a smaller-in-diameter upper tubular member 184 therein, the upper member 184 having a stop collar 186 thereon. The two telescopic members 182 and 184 have alignable diametrical bores 188 therethrough, for reception of a securing pin 190 that is utilized to fix the telescopic brace member 176 at a chosen length.

A winch assembly 192 is carried on the upper side of the lower brace member 182, and the cable 194 therefrom passes first over an inner pulley 196 supported by a bracket 198 welded to the underside of the boom 170, and thence over an outer pulley 200 carried by a bracket 202. The outer end of the cable 194 carries a hook 204, and between the pulleys 196 and 200 the cable 194 passes through the bracket 174.

In use, the boom 170 is normally left in its horizontal position, the assembly 160 then being used as in the earlier embodiments. Should an object of unusual length need to be handled, the pin 190 is removed, the telescopic brace 176 is adjusted to the desired length, and the pin 190 is then replaced. As shown by phantom lines in FIG. 9, the outer end of the boom 170 will then be elevated over its normal horizontal position, thereby enabling the handling of unusually lengthy objects. When the hoisting operation is complete the telescopic brace 176 is returned to its normal length, after which the boom assembly 160 can be stored in the usual way.

From the foregoing specification and drawings it should be apparent that a hoist assembly has been provided that satisfies all the objects hereinabove set forth for the invention. Obviously, many other modifications and variations of the invention are possible. For example, a chain winch could be substituted for the cable wince, if so desired, or the boom assembly could be mounted on the curb-side vertical standard instead of the street-side standard as shown in the drawings. In addition, the one-piece mounting collar 162 of the third embodiment could be used in the first and second embodiments, and other pulley arrangements are feasible.

I claim:

1. A hoist assembly for removably mounting on the sideboards of a pick-up truck box, said sideboards having upwardly opening socket means mounted thereon, and said hoist assembly comprising: a pair of vertical standards, the lower ends of said standards being receivable within said upwardly opening socket means; a bridging member connecting the upper ends of said vertical standards; a boom assembly mounted for rotation about one of said vertical standards, and including a horizontally extending boom, said boom assembly being swingable between a position wherein said horizontal boom extends outwardly from said truck box to a position wherein it lies beneath said bridging member; and cable and winch means carried by said boom assembly for lifting objects to be loaded into or unloaded from said truck box.

2. A hoist assembly as recited in claim 1, wherein the lower ends of said vertical standards and said socket means have alignable transverse bores therethrough, and including additionally pin means for securing said standards to said socket means.

3. A hoist assembly as recited in claim 2, wherein said socket means is structurally reinforced by brace means.

4. A hoist assembly as recited in claim 1, including additionally latch means for releasably securing said horizontal boom in position beneath said bridging member.

5. A hoist assembly as recited in claim 4, wherein said latch means comprises: an upright pin secured to the upper surface of said bridging member, and terminating at its upper end in an enlarged head; and an inverted U-shaped bracket received on said pin, sand engageable over said horizontal boom.

6. A hoist assembly as recited in claim 5, wherein said latch means comprises a latch secured to the other of said vertical standards, and a hook on the end of said cable and engageable with said latch.

7. A hoist assembly as recited in claim 1, wherein said boom assembly further includes: upper and lower mounting collars rotatably mounted on said one vertical standard, said horizontally extending boom being attached at its inner end to said upper mounting collar; and an angled brace member attached between the central portion of said horizontal boom and said lower mounting collar, said one vertical standard having bearing means mounted thereon beneath said lower mounting collar, whereby said boom assembly is freely pivotable about said one vertical standard.

8. A hoist assembly as recited in claim 7, wherein said cable and winch means comprises: pulley means mounted at the outer, free end of said horizontal boom; winch means mounted on said angled brace member; and cable means carried on said winch means, and extending over said pulley means, the outer end of said cable means having a load-engaging element secured thereto.

9. A hoist assembly as recited in claim 1, wherein said bridging member is detachably connected to the upper ends of said vertical standards.

10. A hoist assembly as recited in claim 1, wherein said boom assembly further includes: a one-piece elongated mounting collar rotatably mounted on said one vertical standard, and having upper and lower swivel brackets thereon, said horizontally extending boom being pivotally attached by a pin to the upper one of said swivel brackets; a swivel bracket mounted on the underside of said horizontally extending boom; and a telescopically adjustable angled brace member pivotally attached at its lower end by a pin to said lower swivel bracket on said mounting collar, and pivotally attached at its upper end by a pin to said swivel bracket carried by said horizontally extending boom.

11. A hoist assembly as recited in claim 10, wherein said brace member comprises: a lower tubular member; an upper tubular member telescopically received within said lower tubular member, said upper and lower tubular members having alignable bores therethrough for receiving a pin; and a stop collar carried by said upper tubular member to limit the extent to which it can telescope into said lower tubular member.

12. A hoist assembly as recited in claim 11, wherein said cable and winch means comprises: pulley means mounted at the outer, free end of said horizontal boom, and on said horizontal boom substantially centrally thereof; winch means mounted on said lower tubular member of said brace member; and cable means carried by said winch means, and extending over said pulley means, the outer end of said cable means having a load-engaging element secured thereto.

* * * * *